United States Patent
Einarsen

(10) Patent No.: US 10,697,428 B1
(45) Date of Patent: Jun. 30, 2020

(54) VORTEX WINDMILL

(71) Applicant: James C. Einarsen, Littleton, CO (US)

(72) Inventor: James C. Einarsen, Littleton, CO (US)

( * ) Notice: Subject to any disclaimer, the term of this patent is extended or adjusted under 35 U.S.C. 154(b) by 0 days.

(21) Appl. No.: 16/507,288

(22) Filed: Jul. 10, 2019

(51) Int. Cl.
| | |
|---|---|
| *F03D 3/06* | (2006.01) |
| *F03D 9/25* | (2016.01) |
| *F03D 15/00* | (2016.01) |
| *F03D 3/04* | (2006.01) |
| *H02K 11/00* | (2016.01) |
| *H02K 7/116* | (2006.01) |
| *H02K 7/18* | (2006.01) |
| *F03D 9/11* | (2016.01) |

(52) U.S. Cl.
CPC ........... *F03D 3/061* (2013.01); *F03D 3/0436* (2013.01); *F03D 3/065* (2013.01); *F03D 9/11* (2016.05); *F03D 9/25* (2016.05); *F03D 15/00* (2016.05); *H02K 7/116* (2013.01); *H02K 7/183* (2013.01); *H02K 11/0094* (2013.01); *F05B 2220/706* (2013.01); *F05B 2240/2212* (2013.01); *F05B 2260/4031* (2013.01)

(58) Field of Classification Search
CPC ... F03D 3/061; F03D 9/11; F03D 9/25; F03D 15/00; F03D 3/0436; F03D 3/065
See application file for complete search history.

(56) References Cited

U.S. PATENT DOCUMENTS

| | | | | |
|---|---|---|---|---|
| 2006/0110243 | A1* | 5/2006 | Taylor | F03D 3/0427 415/53.1 |
| 2009/0015019 | A1* | 1/2009 | Donaghey | F03D 13/20 290/55 |
| 2012/0119504 | A1* | 5/2012 | Vigaev | F03D 3/0418 290/55 |
| 2013/0028742 | A1* | 1/2013 | Watanabe | F03D 3/005 416/219 R |
| 2015/0110627 | A1* | 4/2015 | Kim | F03D 3/061 416/197 A |
| 2017/0175711 | A1* | 6/2017 | Burkle | H02K 21/24 |
| 2018/0171981 | A1* | 6/2018 | Bergstrom | F03D 3/062 |

* cited by examiner

*Primary Examiner* — Viet P Nguyen
(74) *Attorney, Agent, or Firm* — Bruce A. Lev

(57) ABSTRACT

A vortex windmill run by incoming air flow to power a generator by which mechanical energy is converted into electrical energy in order to charge a battery. The vortex windmill includes a plurality of elongated blades having bulbous-shaped edges that are spaced from and connected to a rotatable central shaft, and which are located and rotatable within a cylindrical outer cage, such that when the incoming air flow rotates the blades and central shaft a vortex is formed around the central shaft which aids in maintaining the rotational velocity and momentum of the blades and central shaft during operation and for a period of time after the volume of incoming air flow or the velocity of the incoming air flow decreases, thereby increasing the efficiency of the windmill and the amount of energy produced from the air flow received by the windmill.

14 Claims, 2 Drawing Sheets

VORTEX WINDMILL

CROSS-REFERENCE TO RELATED APPLICATION

There are no related applications incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to windmills. More specifically, to windmills having blades rotating a central shaft, such that when rotated by incoming air flow produce mechanical energy convertible to electrical energy.

2. Description of the Related Art

Various prior art references have disclosed different types of horizontally configured windmills. U.S. Pat. No. 4,350,900 discloses a horizontally configured windmill incorporating a plurality of blades redirecting airflow and rotating a central rotor to produce energy. However, it does not, and is not designed to, form a vortex around its rotor. Therefore, this configuration is less efficient and will slow down rapidly once the airflow decreases and/or stops, and as such energy produced therefrom will also be reduced rapidly and/or stopped.

U.S. Pat. No. 4,350,900 discloses a vertically configured windmill incorporating a plurality of blades redirecting airflow and rotating a central axis. However, as with the aforementioned patent, it does not, and is not designed to, form a vortex around the axis. Therefore, this configuration is less efficient and will also slow down rapidly once the airflow decreases and/or stops, and as such electricity produced therefrom will also be reduced rapidly and/or stopped.

Accordingly, the present invention overcomes the disadvantages associated with the prior art by including a plurality of elongated blades having bulbous-shaped edges that are spaced from and connected to a rotatable central shaft, and which are located and rotatable within a cylindrical outer cage, such that when the incoming air flow rotates the blades and central shaft a vortex is formed around the central shaft which aids in maintaining the rotational velocity and momentum of the blades and central shaft during operation and for a period of time after the volume of incoming air flow or the velocity of the incoming air flow decreases, thereby increasing the efficiency of the windmill and the amount of energy produced from the air flow received by the windmill.

BRIEF SUMMARY OF THE INVENTION

In view of the foregoing disadvantages inherent in the known types of windmills or the like in the prior art, the present invention creates a vortex around its central shaft which aids in maintaining the rotational velocity and momentum of the blades and central shaft during operation and for a period of time after the volume of incoming air flow or the velocity of the incoming air flow decreases, thereby increasing the efficiency of the windmill and the amount of energy produced from the air flow received by the windmill. As such, the general purpose of the present invention, which will be described subsequently in greater detail, is to provide a new and improved windmill with all the advantages of the prior art and none of the disadvantages.

It is an object of the present invention to provide a plurality of elongated blades having bulbous-shaped edges that are spaced from and connected to a rotatable central shaft via two radial frames, and which are located and rotatable within a cylindrical outer cage having two spaced radial end braces. The blades are connected at opposite ends thereof to two disc-shaped radial frames that are connected to the central shaft such that when incoming concentrated air flow rotates the blades, the disc-shaped radial frames, and the central shaft, a vortex is formed around the central shaft which aids in maintaining the rotational velocity and momentum of the blades, the disc-shaped radial frames, and central shaft during operation and for a period of time after the volume of incoming air flow or the velocity of the incoming air flow decreases, thereby increasing the efficiency of the windmill and the amount of energy produced from the air flow received by the windmill.

The cylindrical outer cage having two spaced radial end braces houses the blades, the disc-shaped radial frames, and the central shaft therein and are rotatably connected thereto via two spaced sets of circular ball bearings set into the end braces that are attached to opposite side walls of the cylindrical outer cage.

A generator is also provided that is mechanically connected to the central shaft via a set of gears, and which is adapted to convert mechanical energy into electrical energy in order to charge a battery.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Figure 1:
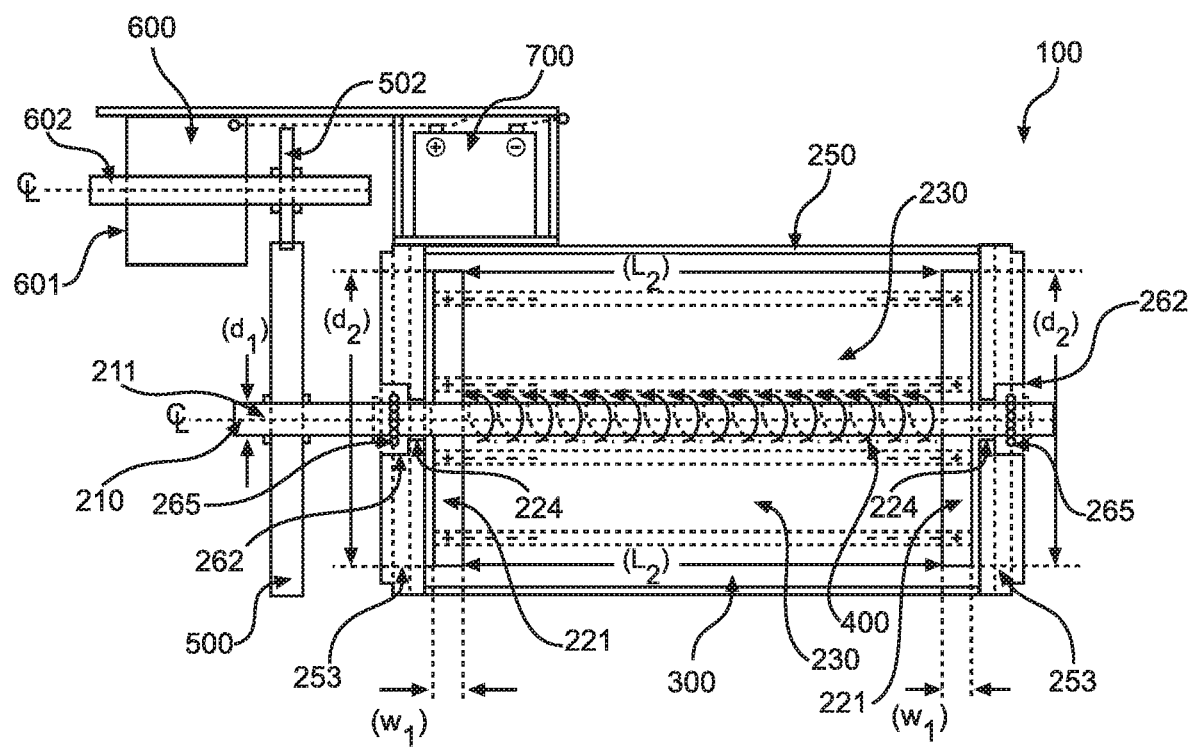
FIG. 1 shows a front cross-sectional view of the vortex windmill of the preferred embodiment.
Figure 2:
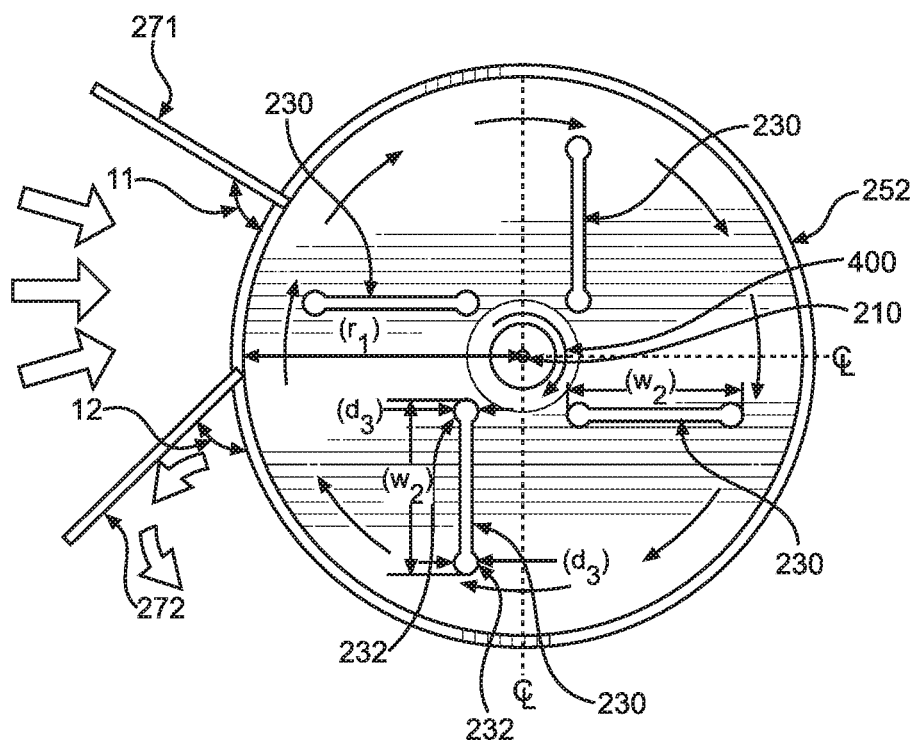
FIG. 2 shows a side cross-sectional view of the vortex windmill of the embodiment of FIG. 1.
Figure 3:
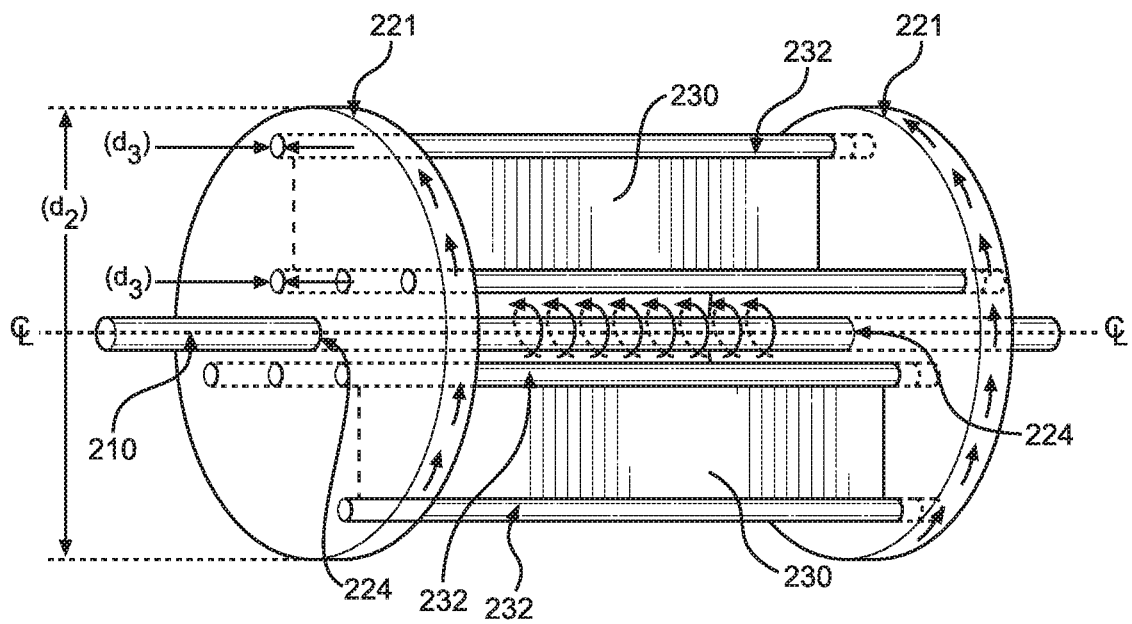
FIG. 3 shows a perspective view of the central shaft, the two radial frames, and the plurality of elongated blades of the vortex windmill of the embodiment of FIG. 1.
Figure 4:
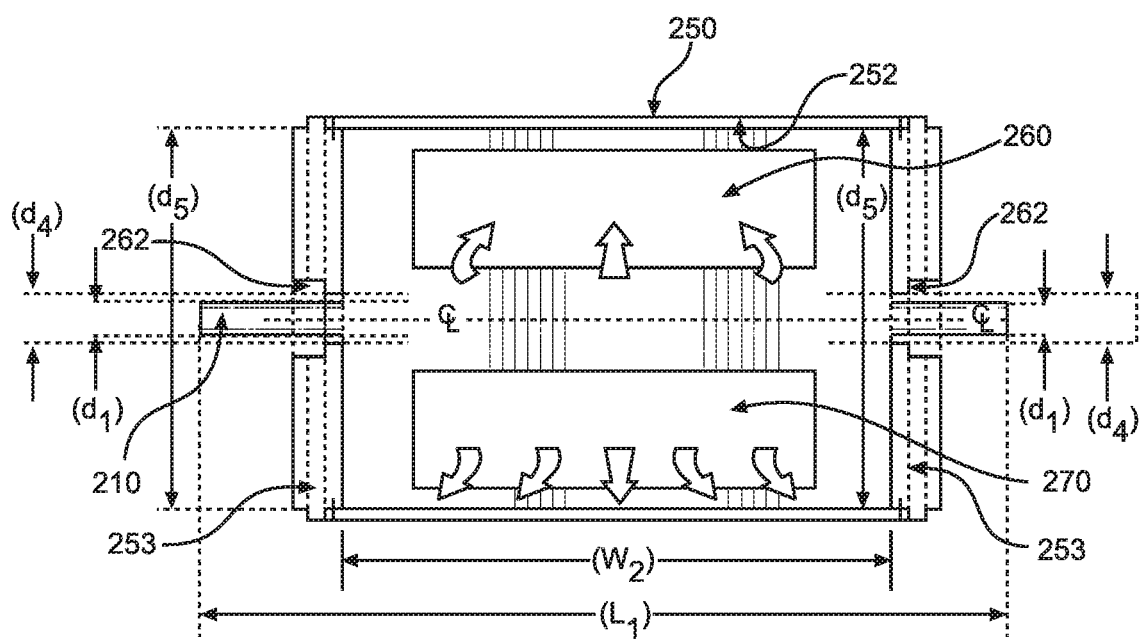
FIG. 4 shows a front view of the cylindrical outer cage with an intake aperture and an exhaust aperture of the vortex windmill of the embodiment of FIG. 1.

Turning now descriptively to FIGS. 1-4, the instant invention discloses as a vortex windmill 100 comprising an elongated central shaft 210 including two opposite ends defining a length (L1) therebetween and a diameter (d1); two radial frames 221 each including a diameter (d2), a width (w1), and a central aperture 224 therethrough adapted to allow the elongated central shaft to pass therethrough and be connected thereto, wherein the two radial frames are connected to the elongated central shaft in a spaced configuration from one another; a plurality of elongated blades 230, each including a length (L2) substantially equal to the space between the two radial frames, a width (w2), and two elongated bulbous-shaped edges 232 each have a diameter (d3) larger than said width (w2) and located on opposite parallel edges thereof and extend along at least a portion of the length and are connected to and between the two radial frames at respective opposite ends thereof in a spaced configuration from one another and in a spaced configuration from the central shaft; a cylindrical outer cage 250 including a main wall 252 including a width (w2) defined between two spaced opposite edges thereof, wherein the main wall is curved and forms an inner diameter (d3) of the cylindrical outer cage, an intake aperture 260 having an elongated shape defined between the two spaced opposite edges and is adapted to allow air flow to pass therethrough, an exhaust aperture 270 having an elongated shape defined between the two spaced opposite edges to allow air flow to pass therethrough, and wherein the exhaust aperture is spaced from the intake aperture in a direction along the radius, an intake deflector panel 271 being elongated and attached at an edge portion thereof to the main wall adjacent the intake aperture, extends outwardly therefrom at an angle 11, and is adapted to deflect air flow into the intake aperture, an exhaust deflector panel 272 being elongated and attached at an edge portion thereof to the main wall adjacent the exhaust aperture, extends outwardly therefrom at an angle 12, and is adapted to deflect air flow exiting from the exhaust aperture, two radial end braces 253, each including a central aperture 262 therethrough having a diameter (d4) adapted to allow the elongated central shaft to pass therethrough, wherein each of the two radial end braces are formed having a disc-shape having a diameter (d5) larger than the diameter (d2) of the two radial frames, wherein the two radial end braces are connected to the main wall at the respective opposite edges of the main wall and thereby form an interior volume 300, and two sets of radial ball bearings 265, each including a central aperture therethrough having a diameter adapted to allow the elongated central shaft to pass therethrough and be rotatably connected thereto, and an outer diameter adapted to fit within the central apertures 262 of the two radial end braces 253 of the cylindrical outer cage 250; wherein the elongated central shaft, the two radial frames, and the plurality of elongated blades are located within the interior volume of the cylindrical outer cage; the two opposite ends of the elongated central shaft extend through the respective two sets of radial ball bearings of the cylindrical outer cage, such that the elongated central shaft, the two radial frames, and the plurality of elongated blades are rotatably connected to the cylindrical outer cage, and are adapted such that when air flow is deflected into the interior volume of the cylindrical outer cage via the intake aperture and then exited outwardly through the exhaust aperture the elongated central shaft, the two radial frames, and the plurality of elongated blades rotate and create a vortex 400 of air flow around the elongated central shaft which aids in maintaining rotational velocity and momentum of the plurality of elongated blades and the central shaft during operation and for a period of time after the volume of incoming air flow or the velocity of the incoming air flow decreases; wherein one 211 of the two opposite ends of the elongated central shaft extends outwardly from the cylindrical outer cage and is adapted to connect with and rotate at least one first gear 500; a generator 600 including a casing 601, and a shaft 602, wherein the shaft extends from an interior of the casing and outwardly therefrom, and is adapted to rotate, wherein the generator is adapted to convert mechanical energy into electrical energy; at least one first gear 500 connected to the one 211 of the two opposite ends of the elongated central shaft extending outwardly from the cylindrical outer cage; at least one second gear 502 connected to the shaft of the generator, and contacts and rotates with the first gear, to thereby rotate the shaft of the generator; and at least one battery 700 electrically connected to the generator and adapted to receive and store electrical energy generated by the generator.

It is important to understand that the shape of the elongated bulbous-shaped edges 232 of the plurality of elongated blades 230 and the (tangential) angle the blades are positioned with respect to the elongated central shaft 210, along with the geometry and relative motion between the shaft and the plurality of elongated blades 230 with respect to the inner surface of the main wall 252 of the cylindrical outer cage 250 force the air flow entering the intake aperture 260 to form a circular air flow around the elongated central shaft 210. This circular air flow around the elongated central shaft 210 forms a vortex 400 which aids in maintaining rotational velocity and momentum of the plurality of elongated blades 230 and the elongated central shaft 210 during operation and for a period of time after the volume of incoming air flow or the velocity of the incoming air flow decreases. Also, by design, the cylindrical outer cage with end braces, intake aperture, and exhaust aperture causes the air flow to be concentrated, regulated, circulated, and disseminated, throughout in the same rotational direction, and then escape through the exhaust aperture and directed opposite to the intake thus reducing drag on the vortex windmill.

In further detail, the instant vortex windmill may have a total of four elongated blades. The elongated bulbous-shaped edges may extend along the entire length of each of the blades. And each of the plurality of elongated blades 230 may have a rectangular cross-section and be substantially flat in between the elongated bulbous-shaped edges. The two radial frames 221 may be disc-shaped, and the plurality of elongated blades 230 can be connected to the two radial frames 221 such that their respective widths (w2) extend in a tangential direction with respect to the circumference of the central shaft 210. The angle 11 of the intake deflector panel 271 may be between 80 and 90 degrees, and the angle 12 of the exhaust deflector panel 272 may be between 45 and 70 degrees. The at least one first gear 500 is usually larger in diameter than the at least one second gear 502. The two sets of radial ball bearings 265 can be formed as self-lubricating steel radial ball bearings. The generator 600 may produce direct current electricity, and the battery 700 may be formed as a 12 volt battery. The intake aperture 260 and the exhaust aperture 270 have elongated rectangular shapes that are formed parallel to one another and extend along a portion of the width (w2) of the cylindrical outer cage.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:
1. A vortex windmill comprising:
    an elongated central shaft including:
        two opposite ends defining a length therebetween; and
        a diameter;
    two radial frames, each including:
        a diameter;
        a width; and
        a central aperture therethrough adapted to allow said elongated central shaft to pass therethrough and be connected thereto;
        wherein said two radial frames are connected to said elongated central shaft in a spaced configuration from one another;
    a plurality of elongated blades, each including:
        a length;
            wherein said length is substantially equal to said space between said two radial frames;
        a width; and
        two elongated bulbous-shaped edges;
            wherein said two elongated bulbous-shaped edges each have a diameter larger than said width and are located on opposite parallel edges thereof and extend along at least a portion of said length;
        wherein said plurality of elongated blades are connected to and between said two radial frames at respective opposite ends thereof in a spaced configuration from one another and in a spaced configuration from said central shaft;
    a cylindrical outer cage including:
        a main wall including:
            a width
                wherein said width is defined between two spaced opposite edges thereof;
            wherein said main wall is curved and forms an inner diameter of said cylindrical outer cage;
        an intake aperture;
            wherein said intake aperture has an elongated shape defined between said two spaced opposite edges and is adapted to allow air flow to pass therethrough;
        an exhaust aperture;
            wherein said exhaust aperture has an elongated shape defined between said two spaced opposite edges to allow air flow to pass therethrough; and
        wherein said exhaust aperture is spaced from said intake aperture in a direction along said radius;
        an intake deflector panel;
            wherein said intake deflector panel is elongated and attached at an edge portion thereof to said main wall adjacent said intake aperture, extends outwardly therefrom at an angle, and is adapted to deflect air flow into said intake aperture;
        an exhaust deflector panel;
            wherein said exhaust deflector panel is elongated and attached at an edge portion thereof to said main wall adjacent said exhaust aperture, extends outwardly therefrom at an angle, and is adapted to deflect air flow exiting from said exhaust aperture;
        two radial end braces, each including:
            a central aperture therethrough having a diameter adapted to allow said elongated central shaft to pass therethrough;
            wherein each of said two radial end braces are formed having a disc-shape having a diameter larger than said diameter of said two radial frames;
        wherein said two radial end braces are connected to said main wall at respective said opposite edges of said main wall and thereby form an interior volume; and
    two sets of radial ball bearings, each including:
        a central aperture therethrough having a diameter adapted to allow said elongated central shaft to pass therethrough and be rotatably connected thereto; and
        an outer diameter adapted to fit within said central apertures of said two radial end braces of said cylindrical outer cage;
    wherein said elongated central shaft, said two radial frames, and said plurality of elongated blades are located within said interior volume of said cylindrical outer cage; said two opposite ends of said elongated central shaft extend through respective said two sets of radial ball bearings of said cylindrical outer cage, such that said elongated central shaft, said two radial frames, and said plurality of elongated blades are rotatably connected to said cylindrical outer cage, and are adapted such that when air flow is deflected into said interior volume of said cylindrical outer cage via said intake aperture and then exited outwardly through said exhaust aperture said elongated central shaft, said two radial frames, and said plurality of elongated blades rotate and create a vortex of air flow around said elongated central shaft which aids in maintaining rotational velocity and momentum of said plurality of elongated blades and said central shaft during operation and for a period of time after the volume of incoming air flow or the velocity of the incoming air flow decreases;

wherein one of said two opposite ends of said elongated central shaft extends outwardly from said cylindrical outer cage and is adapted to connect with and rotate at least one first gear;
a generator including:
   a casing; and
   a shaft;
      wherein said shaft extends from an interior of said casing and outwardly therefrom, and is adapted to rotate;
   wherein said generator is adapted to convert mechanical energy into electrical energy;
at least one first gear;
   wherein said at least one first gear is connected to said one of said two opposite ends of said elongated central shaft extending outwardly from said cylindrical outer cage;
at least one second gear;
   wherein said at least one second gear is connected to said shaft of said generator, and contacts and rotates with said first gear, to thereby rotate said shaft of said generator; and
at least one battery;
   wherein said at least one battery is electrically connected to said generator and adapted to receive and store electrical energy generated by said generator.

2. The vortex windmill of claim 1, wherein there are four elongated blades.

3. The vortex windmill of claim 1, wherein said two elongated bulbous-shaped edges extend along the entire length of each of said plurality of elongated blades.

4. The vortex windmill of claim 1, wherein said two radial frames are disc-shaped.

5. The vortex windmill of claim 1, wherein each of said plurality of elongated blades have a rectangular cross-section and are substantially flat in between said two elongated bulbous-shaped edges; and wherein said plurality of elongated blades are connected to said two radial frames such that their respective widths extend in a tangential direction with respect to a circumference of said central shaft.

6. The vortex windmill of claim 1, wherein said angle of said intake deflector panel is between 80 and 90 degrees.

7. The vortex windmill of claim 6, wherein said angle of said exhaust deflector panel is between 45 and 70 degrees.

8. The vortex windmill of claim 1, wherein said at least one first gear is larger in diameter than said at least one second gear.

9. The vortex windmill of claim 1, wherein said two sets of radial ball bearings are formed as self-lubricating radial ball bearings.

10. The vortex windmill of claim 1, wherein said two sets of radial ball bearings are formed as steel radial ball bearings.

11. The vortex windmill of claim 1, wherein said battery is formed as a 12 volt battery.

12. The vortex windmill of claim 1, wherein said intake aperture and said exhaust aperture have an elongated rectangular shape and are formed parallel to one another.

13. The vortex windmill of claim 1, wherein said intake aperture and said exhaust aperture extend along a substantial portion of said width of said cylindrical outer cage.

14. The vortex windmill of claim 1, wherein said generator produces direct current electricity.

\* \* \* \* \*